United States Patent [19]

Campisi et al.

[11] Patent Number: 4,609,319
[45] Date of Patent: Sep. 2, 1986

[54] COMPONENT DELIVERY SYSTEM

[75] Inventors: Carl Campisi, Chicago; Richard G. Schmid, Glenview, both of Ill.

[73] Assignee: Zenith Electronics Corporation, Glenview, Ill.

[21] Appl. No.: 650,934

[22] Filed: Sep. 14, 1984

[51] Int. Cl.⁴ .............................................. B65H 1/00
[52] U.S. Cl. .................................... 414/224; 414/749; 29/739; 29/759
[58] Field of Search ................................ 29/739–742, 29/759, 809, 564.1, 834–839; 198/412; 414/18, 126, 224, 225, 749, 751

[56] References Cited

U.S. PATENT DOCUMENTS

| | | | |
|---|---|---|---|
| 2,958,869 | 11/1960 | Drukker et al. | 29/741 |
| 3,545,064 | 12/1970 | Zemek et al. | 29/741 |
| 3,605,238 | 9/1971 | Eschholz | 29/809 |
| 3,776,397 | 12/1973 | Hoy et al. | 414/126 |
| 3,889,822 | 6/1975 | Ross | 414/18 |
| 4,077,557 | 3/1978 | Green | 29/741 |
| 4,387,796 | 6/1983 | Enomae | 198/412 |

Primary Examiner—Howard N. Goldberg
Assistant Examiner—P. W. Echols

[57] ABSTRACT

In an automatic delivery system for the mounting of electronic components on a circuit board, the components are sequentially delivered to a movable carriage assembly for proper positioning for engagement by a component pick-up device for insertion on the circuit board. Positioned adjacent to the outlet of a delivery tube internally contoured in accordance with the component configuration is a pivoting retaining member which engages the component after it exits the delivery tube and is deposited upon the pneumatically actuated, linearly displaced carriage assembly to ensure proper orientation of the component thereon as it is displaced toward the component pick-up device. The carriage is contoured in a complementary manner relative to the component in providing a "cradle effect" for maintaining proper component orientation and position with respect to the pick-up device. During the linear displacement of a first component into proper position for engagement by the pick-up device, a second component in the delivery tube is engaged and displaced downward along the tube by means of a component release mechanism so as to exit therefrom and be deposited upon the carriage assembly after it is retracted to an initial, unloaded position. The cycle is then sequentially repeated for each electronic component. The carriage assembly is provided with a telescoping plunger pin or shaft which engages the component and maintains it stably positioned on the carriage assembly during the linear displacement thereof.

22 Claims, 12 Drawing Figures

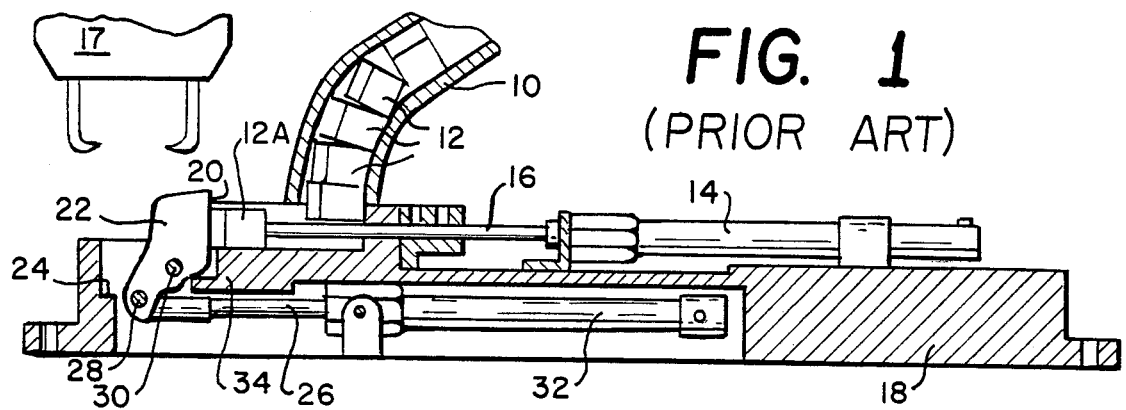
FIG. 1 (PRIOR ART)
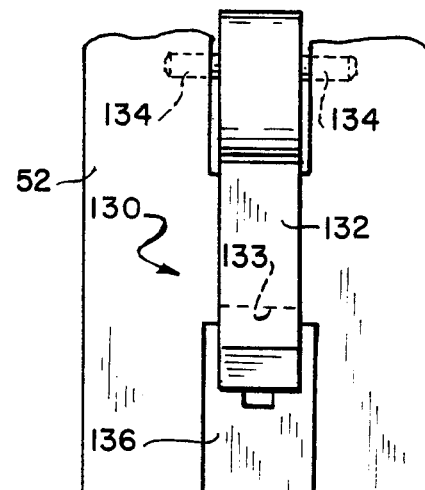
FIG. 4
FIG. 5
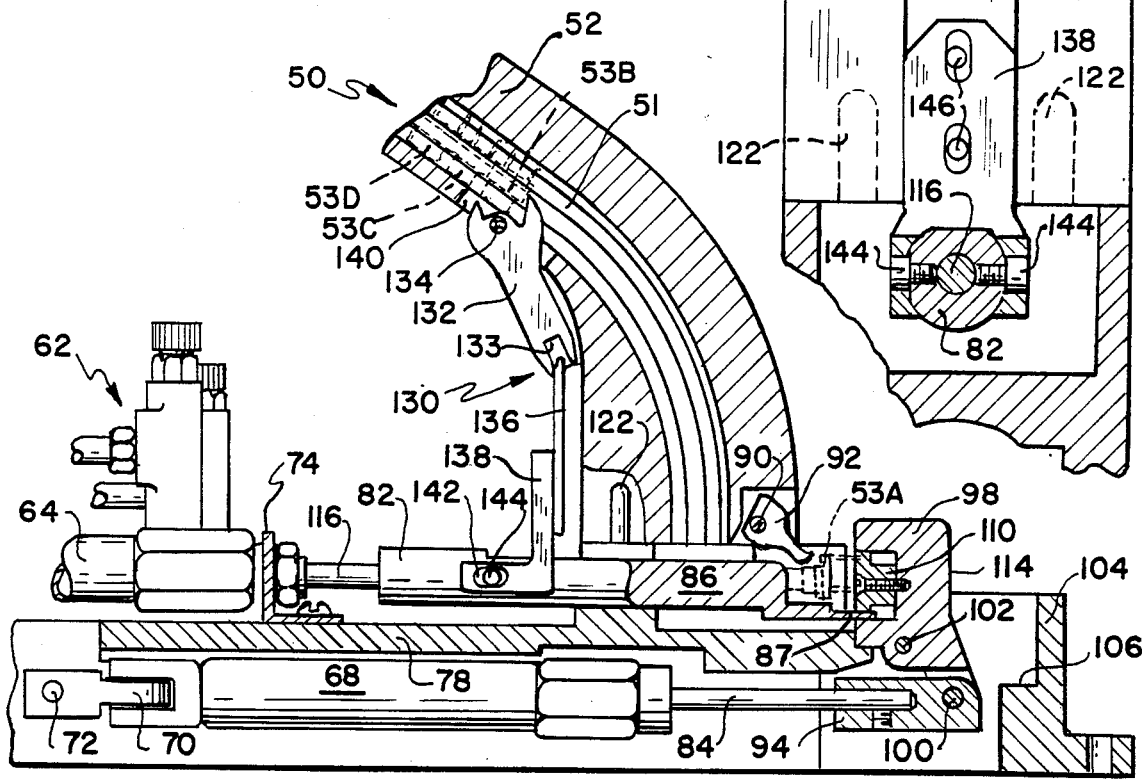

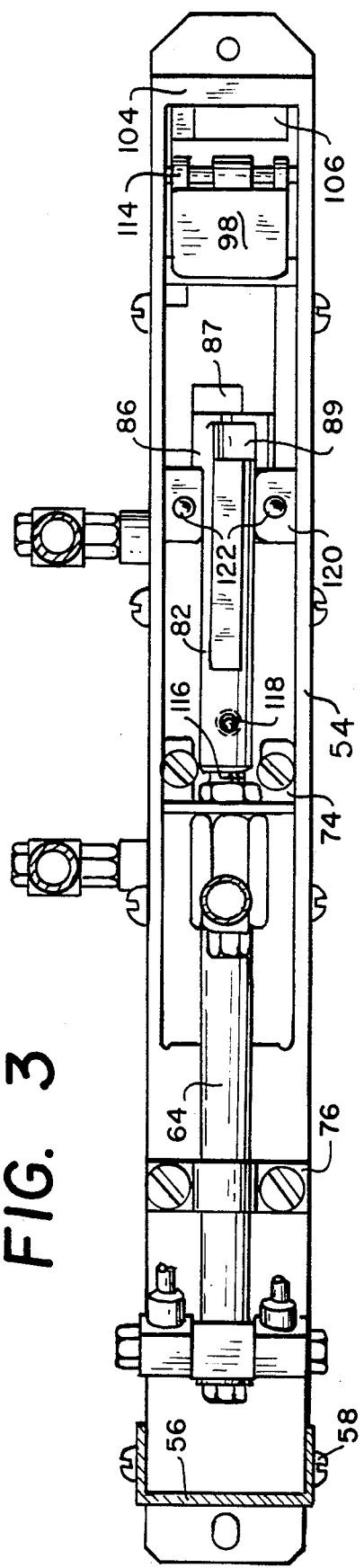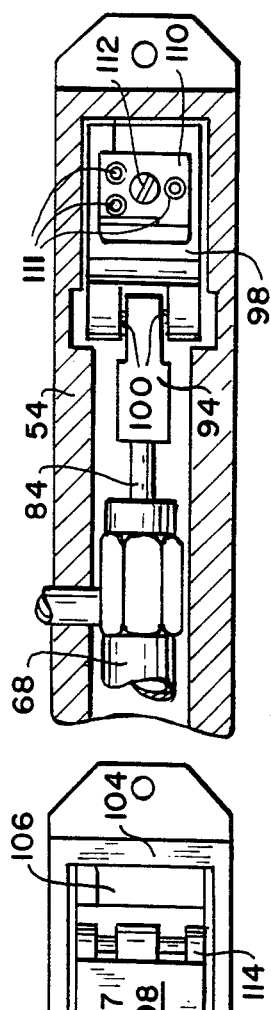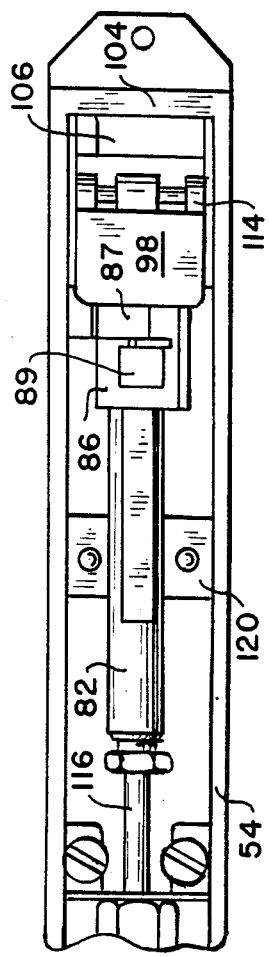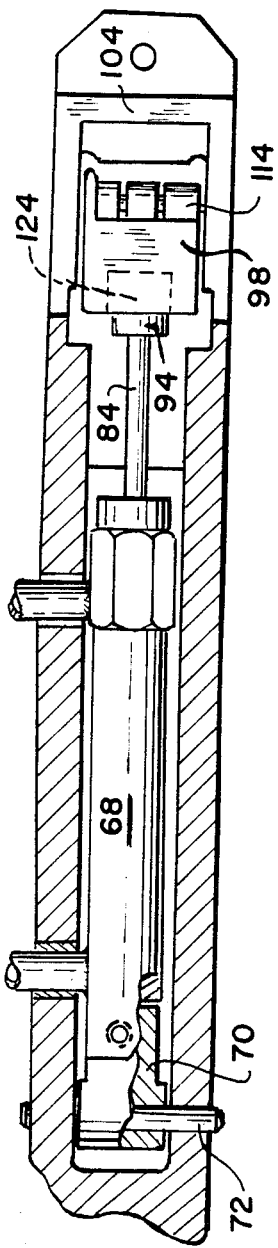

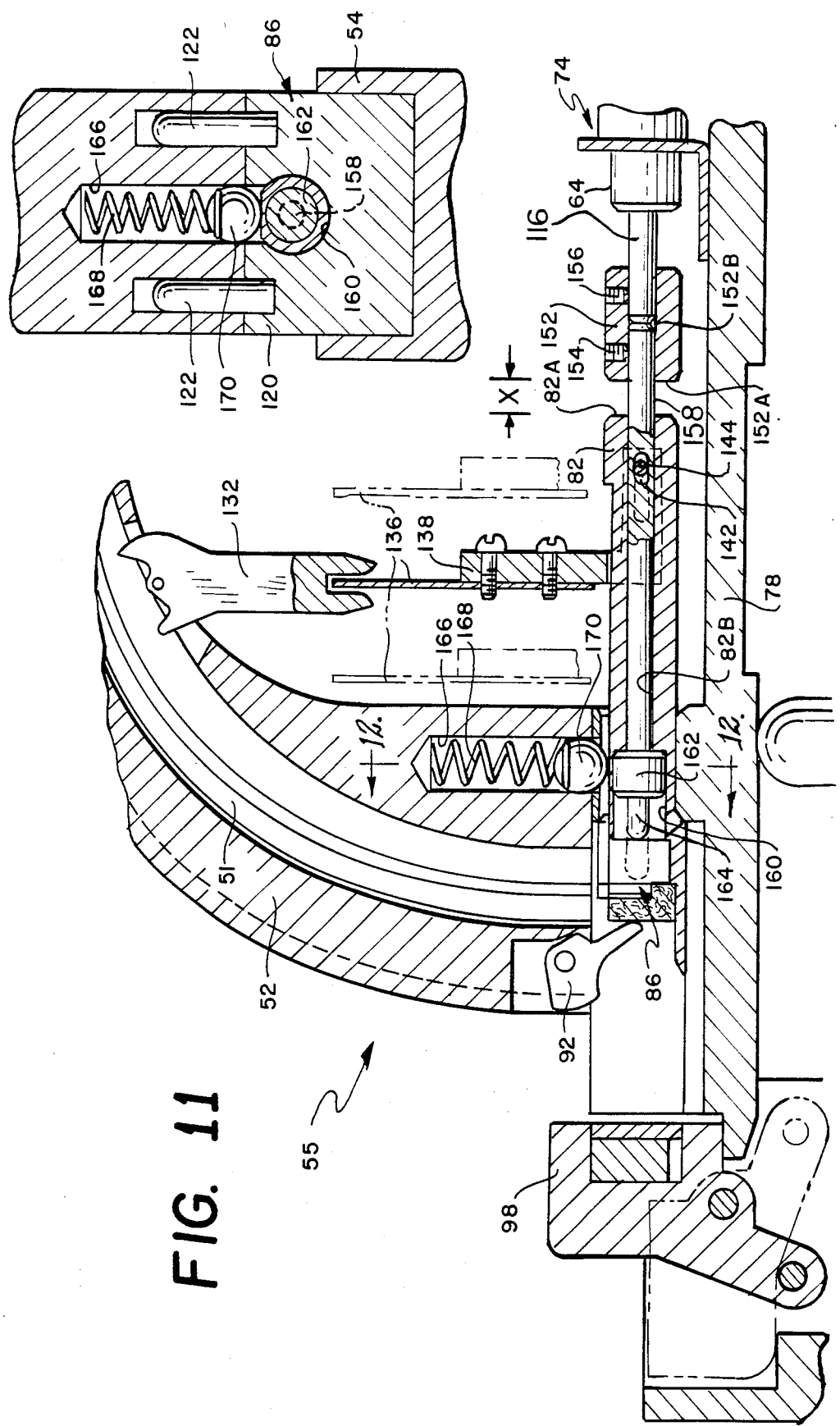

COMPONENT DELIVERY SYSTEM

BACKGROUND OF THE INVENTION

This invention relates generally to automatic circuit board assembly and is particularly directed to the delivery of electronic components for automatic mounting on a circuit board.

The high speed assembly of circuit boards makes use of automatic component insertion equipment for the positioning of electronic components upon the circuit board, or substrate. The component is positioned upon a first side of a circuit board with its conductive leads inserted through predrilled apertures in the board. The component leads are then crimped on a second side of the circuit board for electrical coupling with linear conductors typically in the form of metal foil. In this type of automatic circuit board assembly arrangement, a conveyor typically displaces the board to sequentially arranged work stations whereat various components are mounted to the circuit board by means of a numerically controlled component insertion apparatus. Because the economics of circuit board assembly requires high speed operation and the aforementioned component insertion apparatus typically possesses limited positioning and component grasping flexibility, a highly accurate component delivery arrangement is required for proper positioning and orientation of the electronic component prior to engagement by the automatic insertion apparatus.

One prior art arrangement for the delivery of electronic components to automatic insertion apparatus is disclosed in the aforementioned application and is shown in FIG. 1. The component delivery system includes a delivery chute, or tube, 10 mounted to an elongated base 18 on which are mounted an upper air cylinder 14 and a lower air cylinder 32. The upper and lower air cylinders 14, 32 are coupled to a source of pneumatic pressure (not shown) to effect the linear displacement of cylindrical armatures 16, 26, respectively. The distal end of cylindrical armature 16 is positioned adjacent an aperture in the lower portion of delivery tube 10 through which electronic components 12 positioned therein fall under gravity for subsequent linear displacement by means of cylindrical armature 16. Extension of cylindrical armature 16 by means of the upper air cylinder 14 causes the leftward displacement of an electronic component 12A which is engaged by means of a pivoting component receiver 22. The component receiver 22 is adapted to receive and engage the leads of the electronic component 12A. The component receiver 22 is pivotally mounted to the base 18 by means of a pivot pin 30 and is further coupled to the distal end of cylindrical armature 26 by means of a drive pin 28. Retraction of cylindrical armature 26 results in the counterclockwise rotation of the component receiver 22 following the insertion of electronic component 12A therein. Rotational displacement of the component receiver 22 is limited by a lower receiver stop 24 positioned on an end portion of base 18. With the component receiver 22 rotationally displaced so as to engage the lower receiver stop 24 by means of the linear displacement of cylindrical armature 26, a gripper assembly 17 located above the component receiver 22 then engages, displaces and inserts the component 12A on a circuit board (not shown). Following removal of the electronic component 12A from the component receiver 22, cylindrical armature 16 is then retracted by the upper air cylinder 14 and the component receiver 22 is then rotated in a clockwise direction by means of cylindrical armature 26 so as to engage an upper receiver stop 20 in the base 18 in preparation for receipt of another electonic component from the delivery tube 10.

The component delivery system described above as well as other prior art approaches suffer from various limitations. For example, misalignment of the electronic components within the delivery tube frequently results in the obstruction of the delivery tube and an interruption in component delivery. In addition, the downward displacement by gravity of the electronic components through the opening in the lower portion of the delivery tube frequently causes a reorientation of the electronic component resulting in its misalignment with the component receiver or jamming of the component delivery system such that linear displacement of the component delivery armature is inhibited. Finally, delivery system component dimensional tolerances arising from the continuous, rapid movement of the component displacement means may result in the deposit of more than one component from the delivey tube into the delivery system housing causing the jamming of the component displacement means and an interruption in the component circuit board mounting procedure.

These and other limitations of the prior art are eliminated in the improved component delivery system of the present invention which provides for the controlled release of electronic components from a delivery tube and the stabilizing of the component upon exit from the delivery tube and deposit within the delivery system housing. The component is maintained in proper position and orientation during its linear displacement within the delivery system housing by means of a pivoting component retainer member and the combination of a telescoping linearly displaceable plunger pin or shaft for engaging the component and a movable, contoured carriage for receiving and supporting the component in ensuring its proper insertion within a component receiver for delivery to a robotic gripper assembly for insertion on the circuit board.

OBJECTS OF THE INVENTION

Accordingly, it is an object of the present invention to provide an improved arrangement for the automatic insertion of electronic components on a circuit board.

It is another object of the present invention to provide an improved electronic component delivery system for use in the automatic assembly of circuit boards.

Yet another object of the present invention is to provide for the high speed, accurate and reliable positioning of individual circuit components prior to automatic mounting and coupling in circuit on a circuit board.

A further object of the present invention is to provide for the automatic, continuous and repetitive delivery of electronic components to a designated position and in a desired orientation for subsequent mounting on a circuit board by means of automatic insertion equipment.

A still further object of the present invention is to eliminate delivery tube obstructions caused by misalignment of components is an automatic electronic component delivery system.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a lateral sectional view of a prior art electronic component delivery system;

FIG. 3 is a top plan view of the component delivery system of FIG. 2 with the component delivery tube removed therefrom;

FIG. 4 is a vertical sectional view of the component delivery system of FIG. 2 taken along sight line 4—4 therein showing the component release mechanism in the neutral (vertical) position;

FIG. 5 is a partially cutaway cross sectional view of a portion of the component delivery system of FIG. 2 showing the displacement of an electronic component following its exit from the delivery tube;

FIG. 7 is a top plan view of a component delivery system in accordance with the present invention as shown in FIG. 5 with the component delivery tube removed therefrom;

FIG. 8 is a top plan view of the component delivery system of FIG. 6 with the component delivery tube and the component removed therefrom;

FIG. 9 is a sectional view of the component delivery system illustrated in FIG. 2 along sight line 9—9 therein;

FIG. 11 is a sectional view of another embodiment of the component delivery system showing a telescoping plunger pin or shaft coupled to the delivery plunger of the component carriage for engaging a component positioned on the component carriage; and FIG. 12 is a sectional view of the component delivery system of FIG. 11 taken along sight line 12—12 therein showing the arrangement for biasing the delivery plunger in a fixed position to facilitate relative movement between the telescoping plunger pin and the delivery plunger.

DETAILED DESCRIPTION OF THE PREFERRED EMBODIMENT

Figure 2:
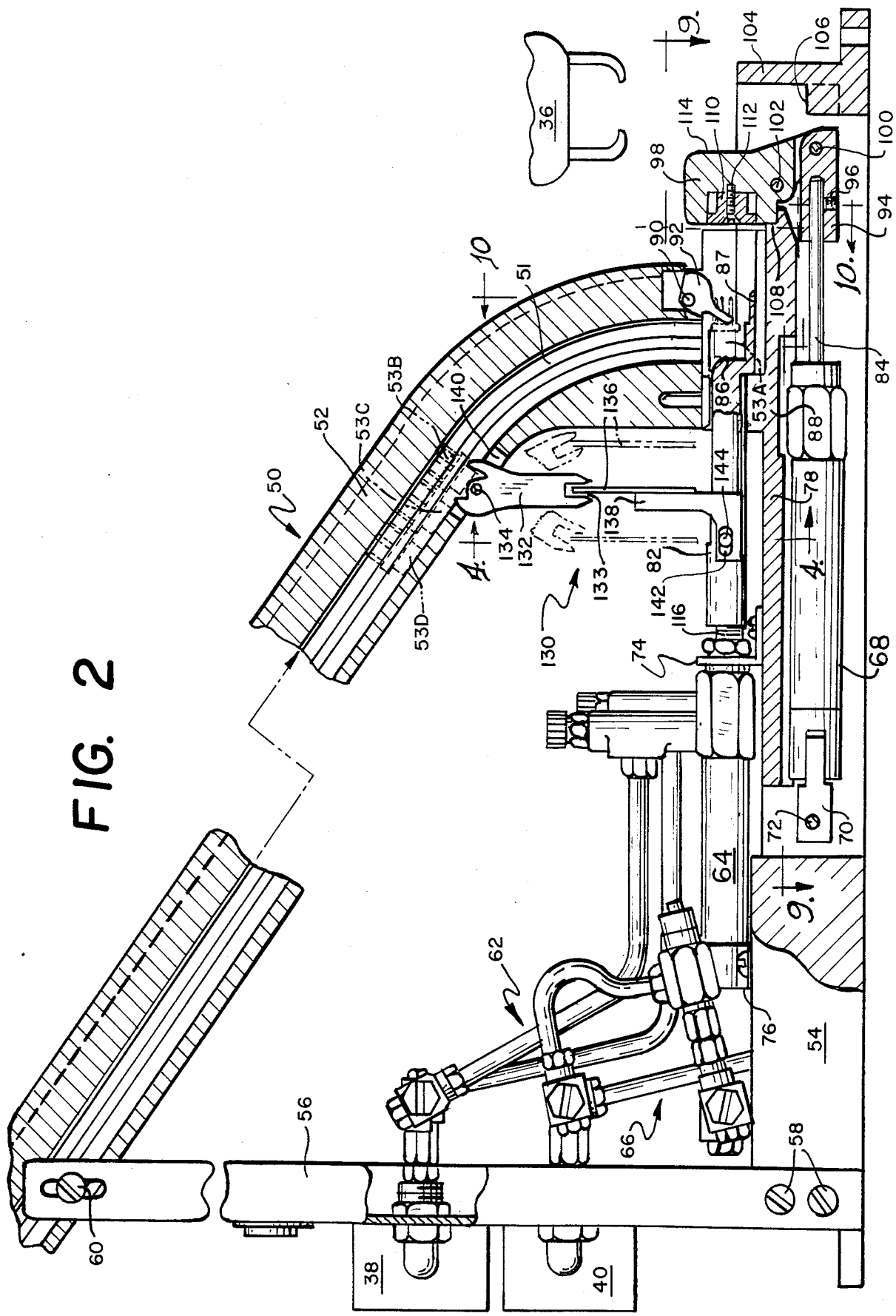
FIG. 2 is a partially cutaway cross sectional view of a component delivery system in accordance with the present invention illustrating the initial position of an electronic component following its exit from a delivery tube.

Referring to the various figures, there are shown various views of a component delivery system 50 in accordance with the present invention. The component delivery system includes a delivery tube, or chute, 52 mounted at a lower, first end thereof to an elongated housing 54 and at an upper portion thereof to a track support bracket 56. An upper portion of the track support bracket 56 is coupled to the delivery tube 52 by means of a mounting screw 60 and provides support therefor. The lower end portion of the track support bracket 56 is securely coupled to an aft portion of the housing 54 by means of a plurality of mounting screw 58. The lower, end portion of the delivery tube 52 is positioned on an upper portion of housing 54.

The delivery tube 52 includes an inner guide slot 51 extending the length thereof wherein are slidably positioned a plurality of electronic components generally designated 53A through 53D. An opening is provided at the lower end of guide slot 51 to permit the electronic components to exit the guide slot under gravity so as to be positioned within the housing 54. The inner surface of the guide slow 51 forms a complementary surface with respect to the outer configuration of the electronic components to ensure that the orientation of the components within the guide slot does not change as they are displaced downward along the guide slot. This also ensures that components which drop downward from the lower end of the guide slot 51 are positioned in a desired orientation within the housing 54. As shown in FIG. 2, an electronic component 53A has been deposited from the guide slot 51 into the housing 54, while the next component to be deposited within the housing 54 from the guide slot 51 is designated as element 53B.

Mounted to an upper portion of the housing 54 by means of forward and aft mounting bracket assemblies 74, 76 is an upper cylinder 64. The upper cylinder 64 is coupled to a first source of pneumatic pressure 38 by means of a first pneumatic delivery system 62. The first pneumatic delivery system 62 includes a generally conventional arrangement of pneumatic couplers, tubing and valves in order to provide pneumatic pressure to the upper cylinder 64. The upper cylinder 64 includes a linearly displaceable and extendable cylinder rod 116 with a forward portion to which is securely mounted a delivery plunger 82. The upper cylinder 64 is a double acting, pneumatically controlled cylinder by means of which the delivery plunger 82 may be linearly displaced along and within the housing 54. A forward end portion of the delivery plunger 82 includes a component carriage 86 adapted to receive and displace electronic components deposited from the guide slot 51 of the delivery tube 52 as described below. The housing 54 includes a center insert 78 positioned therein which is adapted to provide support for the delivery plunger 82 and to limit the rearward displacement thereof.

Positioned in a lower portion of the housing 54 and coupled thereto by means of the combination of a pivot bracket 70 and retainer 72 is a lower cylinder, or air valve, 68. The lower cylinder 68 is coupled by means of a second pneumatic delivery system 66 to a second source of pneumatic pressure 40. The second pneumatic delivery sytem 66 is comprised of various pneumatic connectors, tubes and valves and is conventional in design and operation. Similarly, as in the case of the upper cylinder 64, the lower cylinder 68 is a double acting, pneumatically actuated cylinder which includes a linearly displaceable pivot plunger 84 extending from a forward portion thereof. Securely mounted to a forward end portion of the pivot plunger 84 by means of a set screw 96 is a cylinder coupler 94. The cylinder coupler 94 is pivotally coupled to a pick-up block 98 by means of a retainer pin 100. The pick-up block 98 is also pivotally coupled to the housing 54 by means of a pivot pin 102 extending therethrough. Linear displacement of the combination of pivot plunger 84 and cylinder coupler 94 in response to actuation by the lower cylinder 68 causes the rotation of the pick-up block 98 about pivot pin 102. While the upper and lower cylinders 64, 68 are shown coupled to separate sources of pneumatic pressure, they could as easily both be coupled to a single source of pneumatic pressure capable of sequentially actuating these two cylinders in a manner described below.

The pick-up block 98 includes a hollowed out portion within which is positioned a removable insert 110. The removable insert 110 is securely coupled to the pick-up block 98 by means of a screw 112. The removable insert 110 includes a plurality of apertures 111, as shown in FIG. 8, in an outer surface thereof which are configured to receive and engage conductive pins, or leads, of the electronic components 53. As shown in the various figures, the conductive leads of the various electronic components extend toward the front of the housing 54, and are inserted within the apertures 111 of the pick-up block's removable insert 110. The removable insert 110 is adapted to be easily replaced by another insert having a different aperture configuration on the outer surface thereof in order to accommodate a different electronic component configuration. To accommodate different electronic components, the delivery tube 52 as well as the component carriage 86 would similarly have to be replaced to accommodate the individual configuration of the electronic components being mounted on the circuit board.

The sequence of operation of the component delivery system 50 in inserting a component in the pick-up block 98 is described as follows. Once an electronic component 53A has dropped from the guide slot 51 of the delivery tube 52 onto the component carriage 86, the combination of the component carriage 86 and delivery plunger 82 is displaced rightward by means of the upper cylinder 64. Forward displacement of the component carriage 86 results in the engagement by the removable insert 110 with the conductive pins of the electronic component 53A. Once the electronic component 53A is inserted within and engaged by the removable insert 110, the combination of the delivery plunger 82 and component carriage 86 is retracted by means of the upper cylinder 64 to permit the next electronic component 53B to be similarly received and displaced.

With the electronic component 53A engaged by the removable insert 110 of the pick-up block 98, the combination of the pivot plunger 84 and cylinder coupler 94 is retracted, or moved leftward, by means of the lower cylinder 68. This results in the clockwise rotation of the pick-up block 98 until the contact portion 114 of the pick-up block engages a lower stop surface 106 positioned in a forward portion of the housing 54. With the pick-up block 98 thus rotated clockwise and its contact portion 114 in abutting engagement with the lower stop surface 106, the electronic component 53A is positioned on an upper surface of the pick-up block 98. The electronic component 53A is then grasped by a gripper assembly 36 (shown in FIG. 6) which removes the electronic component from the pick-up block 98 and places it upon a circuit board (not shown). After the electronic component 53A is removed from the pick-up block 98 by means of the gripper assembly 36, the pick-up block 98 is rotated in a counterclockwise direction by means of the extension of the pivot plunger 84 from the lower cylinder 68. Counterclockwise rotation of the pick-up block 98 ends when the pick-up block engages an upper stop surface 108 in a forward portion of the housing 54. In this portion, the pick-up block 98 is ready for receipt and engagement of the next electronic component 53B and the sequence described above is re-initiated.

Figure 6:
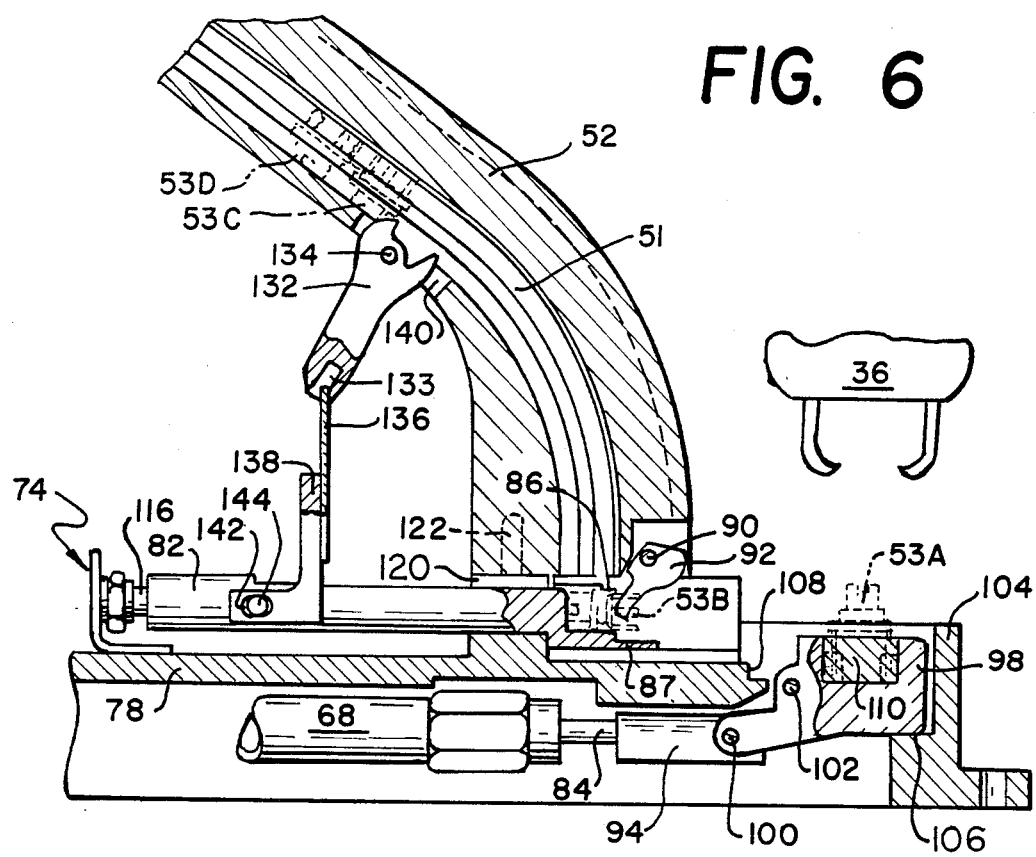
FIG. 6 is a partially cutaway cross sectional view of the component delivery system of FIG. 2 illustrating the next step following that shown in FIG. 5 in the positioning of various electronic components.

Briefly, the sequential operation of the upper and lower cylinders 64, 68 is as follows. Initially, the pivot plunger 84 of the lower cylinder 68 is extended so as to position the pick-up block 98 in a generally vertical orientation with the removable insert portion 110 thereof directed toward the component carriage 86. With the pivot plunger 84 extended, the delivery plunger 82 coupled to the upper cylinder 84 is in the retracted position with the component carriage 86 positioned immediately adjacent to and below the lower end opening of the guide slot 51. Upon the deposit of the electronic component 53A in the component carriage 86, the delivery plunger 82 is displaced leftward by means of the upper cylinder 64 in order to insert the electrical leads of the electronic component 53A within the apertures of the removable insert 110 in the pick-up block 98. Once the delivery plunger 82 is in the fully extended position with the electronic component engaged by the removable insert 110, the cylinder coupler 94 is displaced leftward with the retraction of the pivot plunger 84 by the lower cylinder 68. The electronic component 53A is then oriented so as to be easily engaged by the gripper assembly 36 for mounting on a circuit board. While the pivot plunger 84 is in the retracted position, the delivery plunger 82 is retracted so as to position the component carriage 86 for receipt of the next electronic component 53B. The pick-up block 98 is then rotated in a counterclockwise direction following the removal of the electronic component 53A therefrom by means of the extension of the pivot plunger 84. The removable insert 110 is then in position for receipt of the next electronic component 53B following the extension of the combination of delivery plunger 82 and component carriage 86. This sequence is shown in FIGS. 2, 5 and 6. In FIG. 2, the component carriage 86 is shown in position for receiving the first electronic component 53A. In FIG. 5, the electronic component 53A has been displaced rightward by the extension of the delivery plunger 82 and is now engaged by the removable insert 110 of the pick-up 98. With the electronic component 53A thus engaged, the delivery plunger 82 is retracted for proper positioning of the component carriage 86 for receipt of the next electronic component 53B and the pivot plunger 84 is similarly retracted for the clockwise rotation of the pick-up block 98. This is shown in FIG. 6 just prior to engagement of the electronic component 53A by the gripper assembly 36 for removal from the pick-up block 98.

Pivotally mounted by means of a pivot pin 90 to a lower, end portion of the delivery tube 52 adjacent to an upper portion of the housing 54 is a pivoting retaining lever 92. The retaining lever 92 is free to pivot about pivot pin 90 and includes an aft portion which is adapted to engage each of the electronic components in turn as they are displaced from the guide slot 51 in the delivery tube 52. The retaining lever 92 maintains each of the electronic components in proper orientation as they drop from the guide slot 51 within delivery tube 52 and directs the component onto the component carriage 86 which is contoured in a complementary manner with respect to the electronic components. Thus, the retaining lever 92 ensures proper positioning of each of the electronic components within the component carriage 86 and precludes an electronic component from bouncing out of or becoming misaligned within the component carriage 86. In either of the latter cases, improper positioning of the electronic components upon the component carriage 86 could result in jamming of the component delivery system 50 and an interruption in circuit board assembly. This source of interruption is eliminated by the present invention.

During the rightward displacement of the component carriage 86 by the extension of the delivery plunger 82, the retaining lever 92 maintains contact with the electronic component 53A positioned upon the component carriage. This ensures that proper positioning of the electronic component 53A in the component carriage 86 is maintained and that the electronic component is properly aligned and positioned for engagement by the removable insert 110 of the pick-up block 98. As the electronic component 53A is moved rightward in close proximity to the pick-up block 98, the retainer lever 92 no longer engages the electronic component but is positioned in contact with an upper surface of the delivery plunger 82. Subsequent retraction of the delivery plunger 82 permits the retainer lever 92 to rotate clockwise about pivot pin 90 for engagement with the next electronic component 53B displaced from the guide slot 51 in the delivery tube 52. The next electronic component 53B will not be displaced from the guide slot 51 until the delivery plunger 82 is retracted and the component carriage 86 is positioned immediately beneath the lower, open end of the guide slot 51 as described below.

Figure 10:
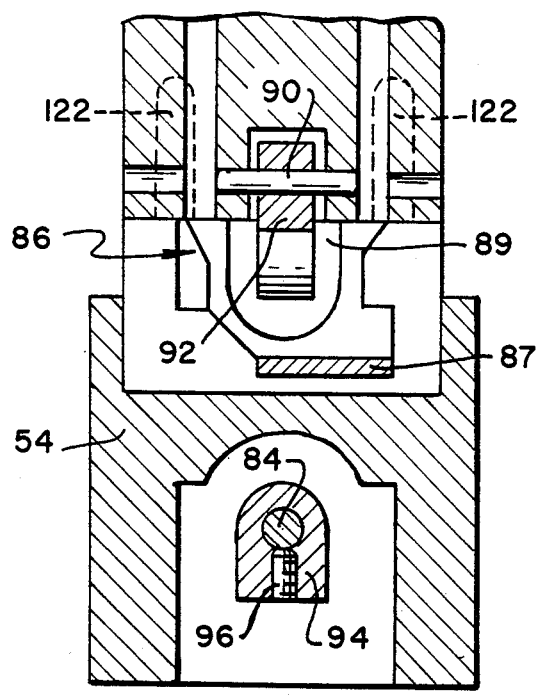
FIG. 10 is a sectional view of the component delivery system of FIG. 2 taken along sight line 10—10 therein showing a front view of the electronic component carriage.

Referring to FIGS. 3, 7, 8 and 9 there are shown various top and horizontal sectional views of the component delivery system 50 of the present invention. FIG. 3 is a top view of the component delivery system shown in FIG. 2 with the delivery tube 52 removed therefrom. FIG. 7 is a top view of FIG. 5 with the delivery tube removed from the housing. FIG. 8 is a top view of FIG. 6 with the delivery tube removed. FIG. 9 is a sectional view taken along sight line 9—9 of FIG. 2, while FIG. 10 is a sectional view taken along sight line 10—10 of FIG. 2. From FIG. 3, it can be seen that the delivery plunger 82 is coupled to the upper cylinder rod 116 by means of a set screw 118. A pair of alignment pins 122 are positioned on an upper surface of a delivery tube mounting plate 120 for proper positioning of the delivery tube 52 on an upper portion of the housing 54. The component carriage 86 includes a forward lip 87 and a recessed portion 89 within which an electronic component may be positioned. From FIG. 5, it can be seen that the forward lip 87 of the component carriage 86 is inserted within the pick-up block 98 to ensure proper alignment therebetween during the insertion of the electronic component 53A in the removable insert 110.

Referring specifically to FIG. 10, there is shown a sectional view of the housing 54 and component carriage 86 of the component delivery system 50 of the present invention taken along sight line 10—10 in FIG. 2. An electronic component may be positioned within the recessed portion 89 of the component carriage 86. The forward lip 87 of the component carriage 89 extends forwardly from a lower portion thereof for engaging the pick-up block 98 as previously described. Shown in an upper portion of FIG. 10 are the delivery tube alignment pins 122 while in the lower, center portion of FIG. 10 is shown the combination of the pivot plunger 84, cylinder coupler 94 and set screw 96. In addition, the retainer lever 92 is shown pivotally coupled to a lower end portion of the delivery tube 52.

The component delivery system 50 of the present invention further includes a component release mechanism 130 as shown in FIG. 2. The component release mechanism includes a release lever 132, the upper end of which is positioned within an aperture 140 in a lower portion of the delivery tube 50 and pivotally coupled to the delivery tube 50 by means of a pivot pin 134. The upper end of the release lever 132 is adapted to engage a portion of an electronic component as it is displaced downward through the guide slot 51 within the delivery tube 52. As shown in FIG. 2, the release lever 132 is engaging electronic component 53B. With the release lever 132 thus coupled to and suspended from the guide tube 52, the lower end of the release lever 132, which includes a recessed portion 133 therein, is engaged by an actuator spring 136. The actuator spring 136 is securely coupled to a spring mounting block 138 through which is inserted the delivery plunger 82. The delivery plunger 82 is freely displaceable along its length within the spring mounting block 138 and is provided with a pair of coupling pins 144 inserted within lateral portions thereof as shown in FIG. 4. The lower, lateral portions of the spring mounting block 138 are each provided with an elongated slot 142 within which is positioned a coupling pin 144. Linear displacement of the delivery plunger 82 in response to actuation by the upper cylinder 64 causes the coupling pins 144 to engage a respective end portion of the elongated slots 142 in the spring mounting block 138 and to effect the linear displacement thereof. Because of the length of the elongated slots 142, the combination of the spring mounting block 138 and the actuator spring 136 will be displaced only a portion of the displacement distance of the delivery plunger 82. This is shown in FIG. 2 wherein are depicted in dotted line form the full forward and full aft positions of the actuator spring and release lever combination. As shown in the figure, the release lever 132 is rotationally displaced about pivot pin 134 in response to the linear displacement of the combination of actuator spring 136 and spring mounting block 138.

The upper end portion of the release lever 132 is adapted to engage an electronic component within the guide slot 51 as shown for component 53B in FIG. 2. Leftward, or rearward, displacement of the delivery plunger 82 corresponding to retraction of the component carriage 86 will cause the clockwise rotation of the release lever 132 and the downward displacement of electronic component 53B along the guide slot 51. The electronic component 53B is then free to slide downward through the guide slot 51 and into position upon the component carriage 86. This situation is shown in FIG. 6 wherein the electronic component 53B is positioned upon the component carriage 86 and the upper end portion of the release lever 132 maintains the next electronic component 53C in position within the guide slot 51. Forward extension of the delivery plunger 82 in order to insert the electronic component 53B within the pick-up block 98 will result in the counterclockwise rotation of the release lever 132. Full forward displacement of the delivery plunger 82 and the combination of spring mounting block 138 and actuator spring 136 coupled thereto will cause the upper end portion of the release lever 132 to securely engage the next electronic component 53C and maintain it in position within the guide slot 51. Retraction of the delivery plunger 82 will result in the clockwise rotation of the release lever 132 about pivot pin 134 and the downward displacement and release of the electronic component 53C which is then free to fall within the guide slot 51 and come to rest upon the component carriage 86. The release lever 132 thus serves to sequentially and temporarily engage each of the electronic components as they are displaced downward within the guide slot 51 and to release each electronic component for positioning within the component carriage 86. This arrangement prevents the electronic components from contacting one another in a lower end portion of the delivery tube 52 which may cause the misalignment of the electronic components therein. Any such misalignment will generally result in an obstruction in the flow of the components through the delivery tube and an interruption in the automatic insertion and mounting of electronic components upon a circuit board.

Referring to FIG. 11, there is shown a sectional view of another embodiment of a component delivery system 55 in accordance with the present invention. The sectional view of FIG. 11 is taken from the side of the component delivery system opposite to that from which the system is viewed in the previously described sectional views. In FIG. 11, elements common to the previously described embodiment of the component delivery system are assigned identification numbers used in the earlier description. In the embodiment of FIG. 11, the delivery plunger 82 is provided with an elongated, linear aperture, or slot, 82B extending the length thereof and within which is positioned a plunger pin or shaft 158. The plunger pin 158 is free to move in a telescoping manner within and along the length of the delivery plunger 82. An aft end portion of the plunger pin 158 is coupled to a forward end portion of the cylinder rod 116 by means of a tube-like coupling 152. The tube-like coupling, or sleeve, 152 includes an elongated aperture 152B extending the length thereof and within which are inserted respective ends of the plunger pin 158 and the cylinder rod 116. The upper cylinder 64 controls the extension and retraction of the cylinder rod 116 and, in turn, the linear displacement of the plunger pin 158. The plunger pin 158 and the cylinder rod 116 are respectively maintained in position within the coupling 152 by means of set screws 154 and 156.

The plunger pin 158 operates in the following manner to engage and securely maintain a component in position upon the component carriage 86. The cylinder rod 116 is initially extended leftward, as viewed in FIG. 11, by the upper cylinder 64. This results in the leftward displacement of the combination of the coupling 152 and the plunger pin 158. The distal end of the plunger pin 158 includes a plunger pin shoulder 162 positioned within an expanded end slot 160 within the delivery plunger 82 and a plunger pin insert 164 positioned on the end of the plunger pin 158. Leftward displacement of the plunger pin 158 causes the insert portion 164 thereof to extend from the delivery plunger 82 and to engage a component (not shown) positioned upon the component carriage 86. Further leftward displacement of the combination of the coupling 152 and the plunger pin 158 causes the forward surface 152A of the coupling 152 to contact an aft surface 82A of the delivery plunger 82 and prevents further relative movement between the plunger pin 158 and the delivery plunger 82. The distance of travel of the coupling 152 prior to engagement with the delivery plunger 82 is generally shown by the length "X" indicated above the plunger pin 158 in the figure. Further extension of the cylinder rod 116 from the upper cylinder 64 results in the displacement of the delivery plunger 82 and the component carriage 86 together with a component positioned thereon toward the pick-up block 98. In addition, the abutting engagement between the tube-like coupling 152 and the delivery plunger 82 results in the leftward displacement of the combination of the actuating spring 136 and the spring mounting block 138 coupled thereto and the actuation of the release lever 132 as previously described. Leftward dislacement of the cylinder rod 116 and the plunger pin 158 terminates when the component positioned upon the component carriage 86 and engaged by the plunger pin insert 164 is positioned adjacent to the pick-up block 98 for engagement therewith and removal from the component carriage 86. As shown in the figures, the insert portion 164 of the plunger pin 158 is adapted for insertion within a recessed portion or an aperture within an electronic component for engagement therewith. However, the present invention contemplates virtually any configuration for the insert portion 164 of the plunger pin 158 for engaging an electronic component of virtually any configuration or shape.

With a component positioned on the component carriage 86 engaged and retained by the pick-up block 98 as previously described, the cylinder rod 116 is retracted by the upper cylinder 64 resulting in the rightward displacement of the plunger pin 158 and the withdrawal of the pin insert portion 164 thereof from the electronic component. Initial retraction of the cylinder rod 116 causes the plunger pin 158 to be displaced along and within the delivery plunger 82 in a telescoping manner. Further rightward displacement of the plunger pin 158 causes the plunger pin shoulder 162 to engage the inner end portion of the delivery plunger 82 which defines a portion of the expanded end slot or bore 160 therein resulting in the rightward displacement, or retraction, of the delivery plunger 82 and the component carriage 86 positioned on an end thereof. The delivery plunger 82 is thus retracted causing the component carriage 86 to be positioned immediately beneath the lower end of the guide slot 51 within the delivery tube 52 for receiving and engaging the next component which exits the delivery tube 52.

Referring to FIGS. 11 and 12, which is a sectional view of the component delivery system taken along sight line 12—12 in FIG. 11, an aft portion of the delivery tube 52 is provided with an elongated, generally vertical, cylindrical slot 166 within which is positioned the combination of a spring 168 and a ball 170 on the end thereof. Expansion of the spring 168 causes the ball 170 to engage an upper portion of the delivery plunger 82. The ball 170 is thus urged downward by the spring 168 in contact with the delivery plunger 82 in providing inertia for the delivery plunger 82. This inertia facilitates the linear displacement of the plunger pin 158 within and along the length of the delivery plunger 82 and permits the insert portion 164 of the plunger pin 158 to be positioned in engaging contact with a component deposited in the component carriage 86 prior to displacement of the combination of the component carriage 86 and delivery plunger 82. In addition, the inertia of the delivery plunger 82 permits the insert portion 164 of the plunger pin 158 to be withdrawn from a component engaged by the pick-up block 98 prior to retraction of the combination of the delivery plunger 82 and the component carriage 86. This arrangement permits the plunger pin 158 to maintain a component stably positioned upon the component carriage 86 during displacement of the component carriage and until the component is engaged by the pick-up block 98. In addition, the biasing arrangement of the spring 168 and the ball 170 prevents the linear displacement of the delivery plunger 82 except when engaged by the plunger pin shoulder 162 or by the tube-like coupling 152.

There has thus been shown an electronic component delivery system for use in the automatic mounting of electronic components upon a circuit board. The component delivery system of the present invention provides for the high speed, sequential, precise positioning of electronic components for engagement by a robotic gripper assembly for insertion on the circuit board. The electronic components are sequentially gravity fed in a controlled manner from a delivery tube into a contoured component carriage where they are securely and stably maintained by means of a movable retaining lever during the linear displacement of the component carriage for proper positioning and orientation of the electronic component for engagement and removal by the gripper assembly.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. In the automatic assembly of a circuit board wherein electronic components having a plurality of conductive leads are positioned on said circuit board by insertion means, a component delivery system for positioning and orienting said components for engagement by said insertion means comprising:
   delivery means containing a plurality of said components, said delivery means including an aperture through which said components are sequentially displaced by gravity;
   component carriage means positioned adjacent said aperture for receiving components displaced therethrough;
   component receiver means for engaging a component inserted therein and for positioning and orienting said component for engagement by said insertion means, said component receiver means including a removable insert uniquely configured for receiving the conductive leads of a given electronic component;
   first control means coupled to said component carriage means for displacing said component carriage means and a component positioned thereon toward and in engagement with said component receiver means;
   alignment means positioned on said component carriage means and movable therewith for engaging said component receiver means in aligning said carriage means with said receiver means when said component carriage means and a component positioned thereon are displaced by said first control means toward and in engagement with said component receiver means in ensuring proper insertion of said component therein; and
   retaining means positioned adjacent to said carriage means for engaging a component following its displacement through said aperture and positioning on said carriage means whereby said component is stably maintained in a desired orientation thereon until engaged by said receiver means.

2. A component delivery system in accordance with claim 1 wherein said delivery means comprises an elongated tube for maintaining the components therein in a desired orientation.

3. A component delivery system in accordance with claim 1 wherein said first control means comprises a pneumatically actuated cylinder coupled to said component carriage for the linear displacement thereof.

4. A component delivery system in accordance with claim 1 further comprising second control means coupled to said component receiver means for the displacement thereof between a first position wherein a component is engaged and a second position wherein a component is removed from said component receiver means by the insertion means.

5. A component delivery system in accordance with claim 4 wherein said component receiver means is pivotally displaced between said first and second positions by said second control means.

6. A component delivery system in accordance with claim 5 wherein said second control means comprises a pneumatically actuated cylinder.

7. A component delivery system in accordance with claim 1 wherein said carriage means is contoured in accordance with the configuration of said components for receiving said components in tight fitting relation.

8. A component delivery system in accordance with claim 1 wherein said carriage means is linearly displaced by said first control means from adjacent said aperture in said delivery means to said component receiver means and wherein said carriage means is returned to a position adjacent said aperture following the removal therefrom of a component by said component receiver means.

9. A component delivery system in accordance with claim 1 wherein said retaining means is positioned adjacent said aperture of said deivery means for engaging a component and ensuring that said component is stably maintained in a desired orientation on said carriage means.

10. A component delivery system in accordance with claim 9 wherein said retaining means is continuously movable between first and second positions during which said retaining means continuously engages a component deposited on and displaced by said component carriage means.

11. A component delivery system in accordance with claim 1 wherein said receiver means receives said leads in tight fitting relation.

12. A component delivery system in accordance with claim 1 further comprising a component release mechanism coupled to said delivery means for sequentially engaging and temporarily maintaining each of the electronic components in position within said delivery means, wherein an electronic component is displaced downward by gravity within said delivery means following its release by said release mechanism.

13. A component delivery system in accordance with claim 12 wherein said delivery means includes a slot therein through which said release mechanism extends for engaging the electronic components.

14. In the automatic assembly of a circuit board wherein electronic components are positioned on said circuit board by insertion means, a component delivery system for positioning and orienting said components for engagement by said insertion means comprising:

delivery means containing a plurality of said components, said delivery means including an aperture through which said components are sequentially displaced by gravity, said delivery means further having a slot therein;

component carriage means positioned adjacent said aperture for receiving components displaced therethrough;

component receiver means for engaging a component inserted therein and for positioning and orienting said component for engagement by said insertion means;

first control means coupled to said component carriage means for displacing said component carriage means and a component positioned thereon toward and in engagement with said component receiver means;

a component release mechanism extending through the slot in said delivery means for sequentially engaging and temporarily maintaining each of the electronic components in position within said delivery means, wherein an electronic component is displaced downward by gravity within said delivery means following its release by said release mechanism and wherein said release mechanism is further coupled to said first control means and responsive to the displacement of said component carriage means for engaging and maintaining an electronic component in position within said delivery means when said component carriage means is displaced toward said component receiver means and for releasing said electronic component when said component carriage means is displaced away from said component receiver means by said first control means; and retaining means positioned adjacent to said carriage means for engaging a component following its displacement through said aperture and positioning on said carriage means whereby said component is stably maintained in a desired orientation thereon until engaged by said receiver means.

15. A component delivery system in accordance with claim 1 further comprising engaging means coupled to said first control means and to said component carriage means and linearly displaceable along said carriage means by said first control means for engaging a component following its displacement through said aperture and positioning on said carriage means for stably maintaining said component in a desired orientation thereon until engaged by said receiver means.

16. A component delivery system in accordance with claim 15 wherein said engaging means is displaced by said first control means and engages a component prior to the displacement of said component carriage means by said first control means.

17. A component delivery system in accordance with claim 16 wherein said component carriage means includes an elongated aperture extending the length thereof and said engaging means includes a linear shaft positioned within and displaceable along said elongated aperture for engaging a component at a first end thereof.

18. A component delivery system in accordance with claim 16 wherein said engagement means is retracted by said first control means following the engagement of a component by said receiver means followed by retraction of said carriage means by said first control means to a position adjacent said aperture for receiving the next component from said delivery means.

19. A component delivery system in accordance with claim 18 further comprising biasing means engaging said carriage means for restricting displacement of said carriage means during initial displacement of said engaging means by said first control means.

20. A component delivery system in accordance with claim 19 wherein said biasing means includes the combination of a spring and a ball urged by said spring in engagement with said carriage means.

21. A component delivery system in accordance with claim 20 wherein said delivery means includes an elongated slot within which the combination of said spring and said ball are positioned for engaging said carriage means.

22. In the automatic assembly of a circuit board wherein electronic components are positioned on said circuit board by insertion means, a component delivery system for positioning and orienting said components for engagement by said insertion means comprising:

delivery means containing a plurality of said components, said delivery means including an aperture through which said components are sequentially displaced;

a component release mechanism coupled to said delivery means for sequentially engaging and temporarily maintaining each component in position within said delivery means, wherein an electronic component is displaced downward by gravity within said delivery means and through said aperture following its release by said release mechanism;

component carriage means positioned adjacent said aperture and contoured in accordance with the configuration of said components for receiving components displaced through said aperture in tight fitting relation;

component engagement means coupled to and linearly displaceable along said component carriage means for engaging and maintaining a component in stable position on said carriage means;

component receiver means for engaging a component inserted therein and for positioning and orienting said component for engagement by said insertion means;

control means coupled to said component engagement means and to said component carriage means for linearly displacing first said engagement means along said carriage means in engaging a component positioned thereon and for then displacing said carriage means and said component toward and in engagement with said component receiver means; and retaining means positioned adjacent to said aperture for engaging a component following its displacement through said aperture and positioning on said carriage means whereby said component is stably maintained in a desired orientation thereon until engaged by said receiver means.

* * * * *